UNITED STATES PATENT OFFICE.

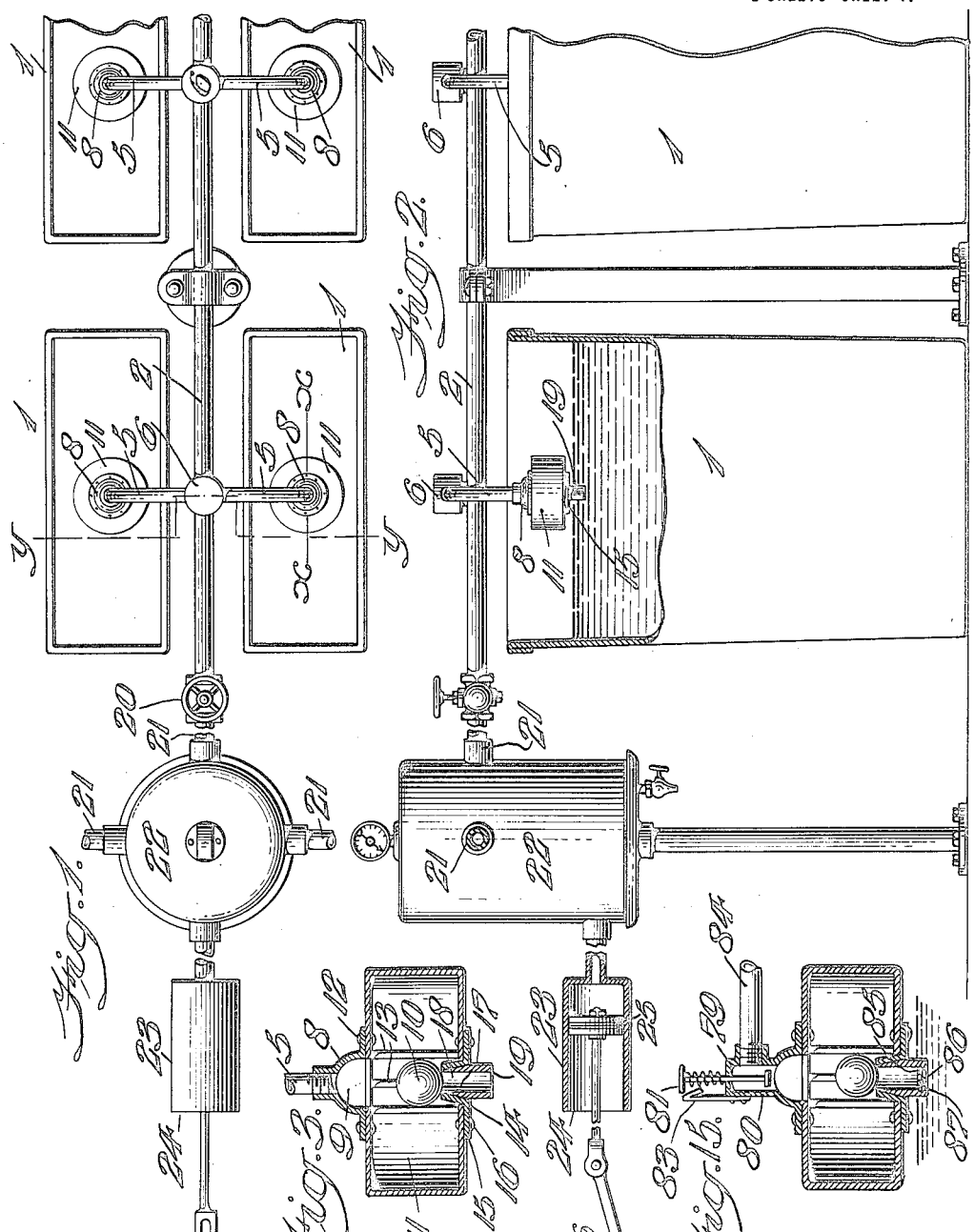

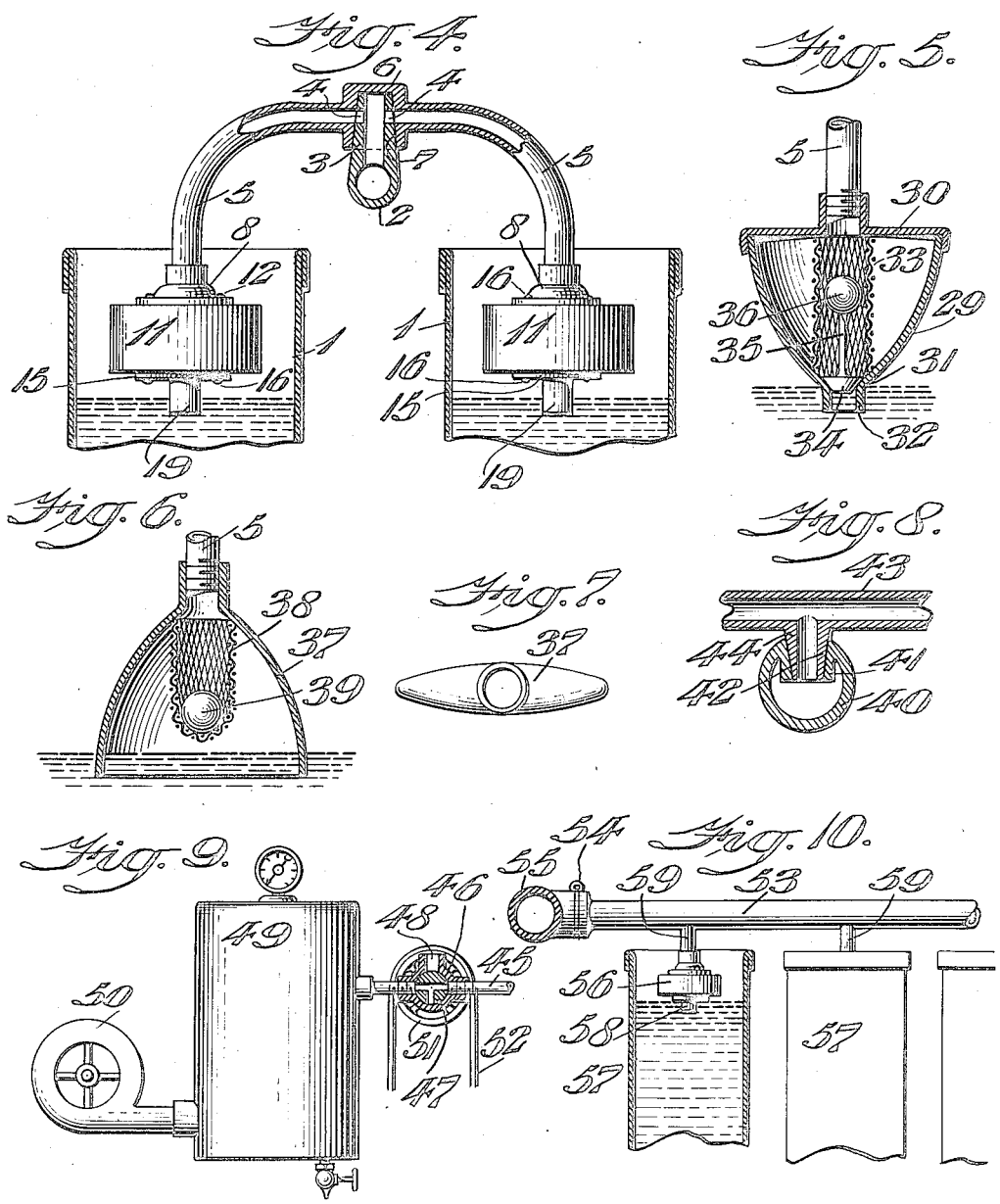

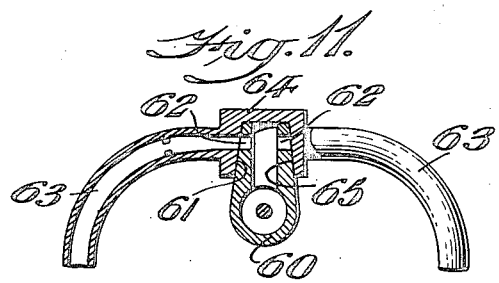
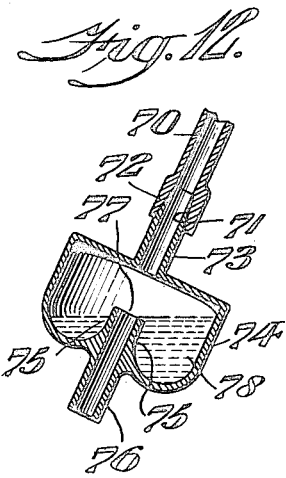
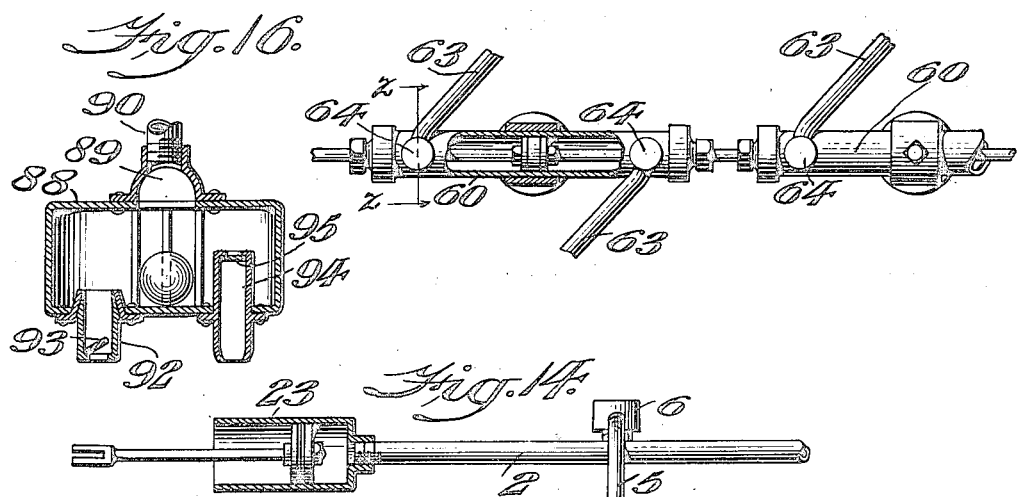
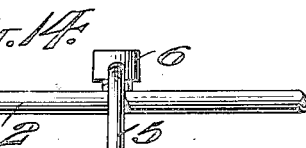

ROBERT J. BERRYMAN, OF PHILADELPHIA, PENNSYLVANIA.

METHOD OF AND APPARATUS FOR MANUFACTURING ICE FROM RAW WATER.

1,225,213.  Specification of Letters Patent.  Patented May 8, 1917.

Application filed March 8, 1915. Serial No. 12,672.

*To all whom it may concern:*

Be it known that I, ROBERT J. BERRYMAN, a citizen of the United States, residing at Philadelphia, county of Philadelphia, State of Pennsylvania, have invented a new and useful Method of and Apparatus for Manufacturing Ice from Raw Water, of which the following is a specification.

The general object of my present invention is to provide an improved method of and apparatus for manufacturing ice from raw water in which impurities carried in the raw water are automatically collected and segregated from the water being frozen as the process of congelation proceeds.

The gist of the invention, in its more general aspects, consists in the agitation and purification of the water being frozen by alternately withdrawing from, and returning to the receptacle or receptacles in which the water is frozen, portions of the unfrozen water, and before returning the portions thus withdrawn, segregating therefrom the impurities contained therein. To accomplish this result I preferably extend into each body of water being frozen, one end of a conduit which is connected at its other end to an intermittent air exhausting apparatus or other means for setting up a flow of water alternately into and out of said conduit, and I provide the conduit with means for trapping, and thus segregating and retaining impurities contained in the water intermittently drawn into the conduit.

It is not novel with me to agitate water during the process of freezing it by alternately sucking a portion of the water up into a conduit and then returning it, but it is broadly novel with me to combine with this mode of agitation, provisions for trapping out impurities from, and thus in effect straining, the portions of water withdrawn, before returning the latter to the body of water being frozen. My invention comprises in addition to its more general features of novelty, certain novel specific features of construction, some of which are not necessarily limited to use in apparatus intended for carrying out my novel method.

The various features of novelty which characterize my invention are pointed out with particularity in the claims annexed to and forming a part of this specification. For a better understanding of the invention, however, and the objects specifically obtained thereby, reference should be had to the accompanying drawings and descriptive matter in which I have illustrated and described preferred forms of apparatus and modes of use embodying my invention.

Figure 1 is a plan view of a portion of an ice forming plant;

Fig. 2 is a side elevation, partly in section, of the construction seen in Fig. 1;

Fig. 3 is a sectional elevation of a portion of the constructions seen in Figs. 1 and 2, the section being taken on the line $x$—$x$ of Fig. 1;

Fig. 4 is a section on the line $y$—$y$ of Fig. 1;

Figs. 5 and 6 are sectional elevations of slightly different forms of apparatus embodying the same specific feature of novelty;

Fig. 7 is a plan view of a portion of the apparatus shown in Fig. 6;

Fig. 8 is a sectional elevation of a modified form of conduit construction which may be employed;

Fig. 9 is an elevation partly in section of an intermittent suction creating mechanism which may be employed in lieu of the pumping mechanism shown in Figs. 1 and 2;

Fig. 10 is an elevation partly in section illustrating another form of conduit construction which may be employed;

Fig. 11 is a sectional elevation taken on the line $z$—$z$ of Fig. 13;

Fig. 12 is a sectional elevation of a modification of the apparatus shown in Fig. 3;

Fig. 13 is a plan view partly in section of a portion of an ice plant differing in the character of the pumping mechanism employed from that shown in Figs. 1 and 2;

Fig. 14 is an elevation partly in section of a portion of an ice plant in which still another form of pumping mechanism is employed; and Figs. 15 and 16 are sectional elevations of other modifications of the apparatus shown in Fig. 3.

In the drawings and referring first to the construction shown in Figs. 1 to 4 inclusive, 1 designates ice cans or molds of any desired construction, and illustrated in the present instance as having their upper ends open so that the water or other material to be frozen may be readily placed therein. It will be understood by those skilled in the art that the ice molds or cans 1 may have any desired contour, and that a battery of ice cans of any desired number may be employed, and that these cans are located within an outer tank in which the refrigerant is circulated in any desired manner. Since the outer container is well known in the art, as are various means for circulating the refrigerant, I have deemed it unnecessary to illustrate and describe such features of construction.

In the apparatus shown in Figs. 1, 2 and 4, 2 designates a main pipe or conduit supported above, and between adjacent rows of ice cans 1. The conduit 2 is provided with upwardly directed tubular conically shaped lugs 3 formed with ports 4 through their side walls shown as diametrically opposite to one another in Fig. 4. Associated with the pipe 2 are branch pipes 5 individual to the various cans 1. The pipes 5 are connected in pairs by body parts 6 formed each with a conical shaped socket 7 adapted to fit snugly over a corresponding lug 3 and thus establish communication between the two branch pipes 5 connected by the body part 6 and the conduit 2. Preferably ground joint connections between the lugs 3 and the body parts 6 are provided. The downturned ends of the branch pipes 5 remote from the body parts 6 are connected each to an individual impurity trapping or segregating vessel 11. As shown, each vessel 11 is in the form of a cylindrical casing with apertures in its upper and lower end walls. The connection between each vessel 11 and the corresponding pipe 5 is shown as made by a hollow connecting member 8 having a flange secured to the upper end wall of the vessel 11 by fastening devices 12, and provided with a threaded socket into which the lower end of the pipe 5 is screwed. The connector member 8 is formed with an internal valve seat 9 against which a ball valve 10 may seat to close communication between the pipe 5 and the vessel 11 under certain conditions as hereinafter explained. Rods 13, or the like within the vessel 11 form a cage for the valve 10. A hollow conical member 14 projects into the vessel 11 above the bottom wall of the latter through the aperture therein, and is formed with a flange 15 secured against the bottom wall of the vessel 11 at the margin of the aperture therein by fastening devices 16. The internal conical wall 17 of the nipple 14 is shaped to snugly receive and releasably hold the upper conical end 18 of a short pipe 19 which extends into the body of water contained in can 1 to which the vessel 11 pertains.

The conduit or conduits 2 of the plant are connected with means for causing the withdrawal of a portion of the water to be frozen from each of the various ice cans and the return to each can of the water so withdrawn from it. The means for accomplishing this shown in Figs. 1 and 2 comprise a conduit 21 connected to the conduit 2 by a valve 20 leading from a main tank 22. The lower end of the tank 22 is connected to the cylinder 24 of a single acting pump 23. The piston 25 working in the pump cylinder 24 is pivotally connected to one end of a connecting rod 26 which has its other end adjustably connected with an eccentric or crank 27 mounted on a shaft 28 driven from any desired source of power.

In the operation of the apparatus shown in Figs. 1 to 4 each suction stroke of the pump 23 tends to create a vacuum in the upper ends of the various branch conduits, individual to each can, and each formed by a pipe 5, vessel 11 and pipe 19. This draws some of the unfrozen water from each can into the corresponding segregating vessel 11. On the return or compression stroke of the pump 23, the water drawn into each vessel 11 will be returned to the can 1 beneath it, except for the portion retained in the vessel 11 below the level of the upper end of the nipple 14. All or a portion of the impurities drawn into each vessel 11 on each suction stroke of the pump 23 will not return to the body of water being frozen on the following compression stroke of the pump, but with the impurities previously collected therein will remain in the vessel 11, being trapped therein by the nipple 14. The pump 23 will ordinarily be kept in operation throughout the freezing process until the lower ends of the pipes 19 are frozen into the blocks of ice which have been formed.

After the cake of ice has been fully formed, each body portion 6, and the branch pipes 5 and vessels 11 connected thereto are bodily removed as a unit, leaving the corresponding pair of nipples 19 in the corresponding blocks of ice. The nipples 19 may then be broken away from the blocks of ice in which they are embedded, either before or after the ice is removed in the usual manner from the cans. The float valves 10 in the vessels 11 rise with the water level in the vessels 11 and close off communication between the pipes 5 and vessels 11 in time to prevent any water being drawn through the pipes 5 into the conduit main 2. This obviates all tendency of the apparatus to mix water drawn out of one can with that drawn from another and thus destroy the uniformity in the amounts of water maintained in the different cans, and also insures the proper uniformity of circulation into and out of the different vessels 11, notwithstanding the fact that the pump suction and compressing effects on the pipes 5 nearer the tank 22 are greater than the corresponding effects on the pipes more remote from the tank.

The agitation, during congelation, of the body of water being frozen which results from the alternate sucking up and squirting back of a portion of the water, prevents foreign objects, impurities segregated out of the water during congelation, and bubbles of air from being frozen into the ice formed prior to the time when the nipples 19 are frozen into the ice. When this occurs, the further sucking up and squirting back of the unfrozen water is prevented, but inasmuch as the then unfrozen portion of the water is comparatively small in amount, and inasmuch as the impurities contained therein are comparatively small in amount because of the previous impurity collecting effect of the trap vessel 11, the core of ice formed from the partially frozen ice immediately beneath the nipple 19 is neither very large nor does it contain much impurity. The size of the relatively impure core portion of the cake of ice is decreased, and its purity is enhanced by the fact that a considerable portion of the water not yet frozen at the time the nipples 19 are frozen into the cake of ice is eventually forced up above the cake of ice proper into the trap vessel 11 by the expansion attending the solidification of the water. The portion of water thus forced into the trap vessel contains the greater portion of the impurities in the water unfrozen at the time when the corresponding nipple 19 is frozen in.

The float valves 10 form very simple and effective means for accomplishing the purpose specified, and possess the advantage that they are practically frictionless in operation so that practically no energy is consumed in the pumping mechanism in giving these valves their movements. Valves of this character may be used with advantage in water agitating pipes not having impurity trapping provisions. Two constructions of this character are shown in Figs. 5 and 6. In Fig. 5 a vessel 29 terminating at its lower end in a tubular portion or nipple 32 is connected to the lower end of a pipe such as the branch pipe 5 which is shown as in threaded engagement with the removable closure or top 30 of the vessel 29. The body of the vessel converges downwardly and forms a valve seat 31 at the upper end of the tubular extension or nipple 32 which extends into the body of water being frozen. 33 represents an apertured sleeve forming a guide cage for a float valve 36 adapted to engage a seat formed in the top member 30 and thus closes off the suction through the pipe 5 on a predetermined rise in water level in the vessel 29. The float 36 is connected by a depending stem 35 to a valve 34 which is adapted to engage a seat 31 and close the nipple 32 when the height of water level in the vessel 29 is low enough to permit this. The use of the valve 35 facilitates the removal of the impure water contained in the vessel 29 when the latter is broken away from the cake of ice after the latter has been completely formed.

In the construction shown in Fig. 6, a casing 37 is employed having a tubular extension at its upper end into which a pipe such as the branch pipe 5 is adapted to be connected. 38 designates a valve cage illustrated as consisting of a sleeve of apertured metal or the like closed at its lower end, and secured in any desired manner at its upper end to the casing 37. In case a rectangular ice can is employed, the shape of the casing 37 will conform with advantage substantially to that seen in Fig. 7, it being understood that in all of the different forms of impurity trapping and receiving vessels herein illustrated, the casing which forms the impurity trapping or receiving chamber may differ in contour with the contour of the ice can in conjunction with which it is used, and where a construction is used as shown in Fig. 6, the cup formed in the ice cake during the freezing operation would be covered by the casing of the impurity receiving chamber.

It will be apparent to those skilled in the art that many changes may be made in the form of the apparatus disclosed and to some extent in its mode of use without departing from the general spirit of my invention. For example, the conduits connected with the impurity trapping or receiving receptacles may be connected to the air mains as shown in Fig. 8 rather than as shown in Fig. 4. In Fig. 8, the conduit or air main 40 corresponding to the conduit 2 of the construction first described is provided with inwardly extending hollow lugs formed each with an internal conical socket wall 42 adapted to receive the conical outer wall of the apertured lug 44 extending from the branch pipe portion 43.

In the broad scope of my invention any desired means may be employed to effect the withdrawal and return to its respective ice can of a portion of the water which is to be frozen, and in Fig. 9 I have illustrated a conduit 45 which may correspond to a conduit 2 in the construction already described, the rest of the mechanism being similar to any of the embodiments herein described. The conduit 45 is connected with the valve mechanism 46 within which is rotatably mounted a three-way valve 47 adapted to place the conduit either in communication with a port 48 which is open to the atmosphere or to pressure, or with a conduit leading to the tank 49 which is connected with a suction creating device such as, for example, a rotary pump 50. 51 designates a pulley mounted on the valve 47 and around which passes a belt 52 which is continuously driven by any desired source of power. It will be seen that in this embodiment, the rotation of the valve 47 will intermittently place the conduit 45 in communication with the tank 49, and the suction will then cause a portion of the water to be frozen to be drawn within the chamber of the segregating casing. On the further rotation of the valve the conduit 45 will be placed in communication with the atmosphere or pressure through the port 48 and the water in the chamber will be permitted to flow back by gravity or forced back by pressure into its respective ice can.

In the embodiment seen in Fig. 10, the conduit 53 may correspond with a conduit 2 shown in Figs. 1 and 2, but instead of being stationary it is hinged at 54 to a stationary portion 55 leading to the pumping mechanism. The casing 56 corresponds in construction to the casing 11 seen in Fig. 3 and into the water in the ice can 57 extends the nipple 58. In this embodiment the casing 56 is preferably rigidly connected with the conduit 53 by means of a tubular extension 59.

In Figs. 11 and 13 I have illustrated a construction in which is employed a double-acting pump 60 corresponding in construction and function to that disclosed and broadly claimed in my copending application for Letters Patent filed by me on the 26th day of November 1913, Serial No. 803,089. This pump 60 has its casing provided with outwardly extending conical lugs 61 which are apertured and communicate with ports 62 which in turn communicate with branch pipes 63 connected at their inner ends to a body portion 64. The latter is provided with a conical aperture 65 with the wall of which the corresponding lug 61 engages. The lower ends of the conduits 63 may be connected with any of the forms of impurity trapping or receiving vessels shown. In operation each pump cylinder withdraws water from one can through one branch pipe 63 while returning water through another branch pipe to a second can.

In Fig. 12 I have shown another form of my invention wherein the conduit 70 is designed to be connected with the means employed to effect the withdrawal and return of a portion of the water to be frozen to its respective can. The lower end of the conduit 70 is provided with a conical wall 71 with which is adapted to engage the conical end 72 of a conduit 73 which forms a tubular extension of a casing 74 the bottom wall of which is rounded and inwardly directed as at 75 to form part of a discharge conduit 76. The inner end of said discharge conduit, as at 77, is projected into the chamber 78 above the bottom thereof so that a trap is formed to collect the impurities in the raw water.

In the embodiment seen in Fig. 14 the construction is substantially the same as seen in Fig. 1 except the tank 22 is omitted and the pump mechanism 23 is directly connected with the conduit 2.

In the embodiment seen in Fig. 15, the construction is similar to that seen in Fig. 3 except that I have shown in addition means to unseat the valve, said means comprising a plunger 79 extending through a bracket 80 and provided with a cap 81 between which and said bracket is interposed a spring 82. 83 designates a spring having its free end adapted to engage the cap 81 to maintain the valve out of engagement with its seat so that a continued suction in the conduit 84 may remove water from the trap chamber. This means for fixing the valve may also be employed in conjunction with the other embodiments of my invention herein shown. In Fig. 15 I also illustrate the use of an inwardly opening valve 85 provided with a port 86 therethrough. On the suction stroke the valve is raised permitting the water to flow into the segregating chamber and on the pressure stroke the valve engages a seat 87 so that the water discharging from the segregating chamber must pass through the restricted port 85 so that the velocity of the water on its return stroke is increased and the requisite agitation of the water in the ice can is obtained.

In the modified form of trap vessel seen in Fig. 16, 88 designates the casing of a segregating chamber 89 having a pipe 90 communicating therewith and with the pumping mechanism. The pipe 90 may correspond to the branch pipes 5 of the construction shown in Figs. 1 to 4. 91 designates a nipple having a conical bearing into which the end of a pipe 92 is adapted to be moved said pipe having therein an inwardly opening valve 93. 94 designates a conduit projecting into the casing 88 and provided with an outwardly opening valve 95. On the suction stroke of the pump the valve 93 will open and the valve 95 will close, the water in the ice cans passing through the pipe 92 into the chamber 89. On the pressure stroke the valve 93 will close and the valve 95 will open and the water will be returned to the can through the conduit 94. Since the conduit 94 extends into the chamber 89 a desired level of water will be maintained in such chamber and a trap will be formed for the foreign impurities.

It will now be apparent that I have devised a novel and useful method of and apparatus for manufacturing ice from raw water which embodies the features of advantage enumerated as desirable in the statement of the invention and the above description, and while I have, in the present instance shown and described preferred embodiments thereof which will be found in practice to give satisfactory and reliable results, it is to be understood that the same are susceptible of modification in various particulars without departing from the spirit or scope of the invention or sacrificing any of its advantages.

Having now described my invention, what I claim as new and desire to secure by Letters Patent, is:—

1. In the method of manufacturing ice by subjecting a body of water to a freezing temperature and agitating the unfrozen water during congelation by intermittently withdrawing and returning a portion of the unfrozen water, the improvement which consists in segregating impurities from the water withdrawn before returning the water.

2. In the method of manufacturing ice by subjecting a body of water to a freezing temperature and agitating the unfrozen water during congelation by intermittently withdrawing and returning a portion of the unfrozen water, the improvement which consists in trapping and retaining impurities in the water so withdrawn before returning the water.

3. In the method of manufacturing ice in receptacles partially immersed in a freezing solution and in which the unfrozen water content is agitated during congelation by alternately sucking up and squirting back a portion of the unfrozen water through conduits extending downward into the upper ends of the receptacles, the improvement which consists in segregating impurities from the water sucked out of each receptacle before the return of the water to the can.

4. Apparatus for the manufacture of ice comprising in combination a receptacle for the water to be frozen, and means for intermittently withdrawing water from the receptacle, segregating impurities therefrom and returning it to the receptacle, said means including an impurity collecting trap through which the water so withdrawn and returned is passed.

5. Apparatus for the manufacture of ice comprising in combination a receptacle for the water to be frozen, and agitating and purifying provisions comprising a conduit dipping into the upper end of the body of the water contained in said receptacle, and means for intermittently withdrawing through said conduit a portion of the water contained in said receptacle, segregating impurities therefrom and then returning it to said receptacle.

6. Apparatus for manufacturing ice comprising a receptacle for the water to be frozen, a conduit extending into the upper end of the body of water contained in the receptacle, means for creating a flow alternately into and out of said receptacle through said conduit and means for trapping impurities contained in the water passing into the conduit from the receptacle.

7. Apparatus for manufacturing ice comprising in combination a receptacle for the water to be frozen, and means including a conduit extending into the upper end of the body of water contained in the receptacle for intermittently withdrawing and then returning an unfrozen portion of the water in said receptacle, said conduit having provisions for trapping and retaining impurities in the water withdrawn from the receptacle through the conduit.

8. Apparatus for the manufacture of ice comprising a plurality of receptacles for water to be frozen, conduits individual to and extending into the upper ends of the bodies of water contained in said receptacles, a common air exhausting means for alternately sucking water from the receptacles through said conduits and for permitting it to return to said receptacles and float actuated valves located in said conduits and closing the latter when the water level therein rises to a predetermined height.

9. An impurity collecting receptacle for the purpose described having a detachable depending conduit portion and comprising internal provisions for trapping impurities contained in water passing into said receptacle through said conduit portion.

10. An impurity collecting receptacle for the purpose described comprising a chambered member with upper and lower conduit portions, and with internal provisions for trapping impurities contained in water passing into said member and a float valve mounted in said member and adapted on a predetermined rise in water level therein to close said upper conduit portion.

ROBERT J. BERRYMAN.

Witnesses:
H. S. FAIRBANKS,
C. D. McVAY.